UNITED STATES PATENT OFFICE.

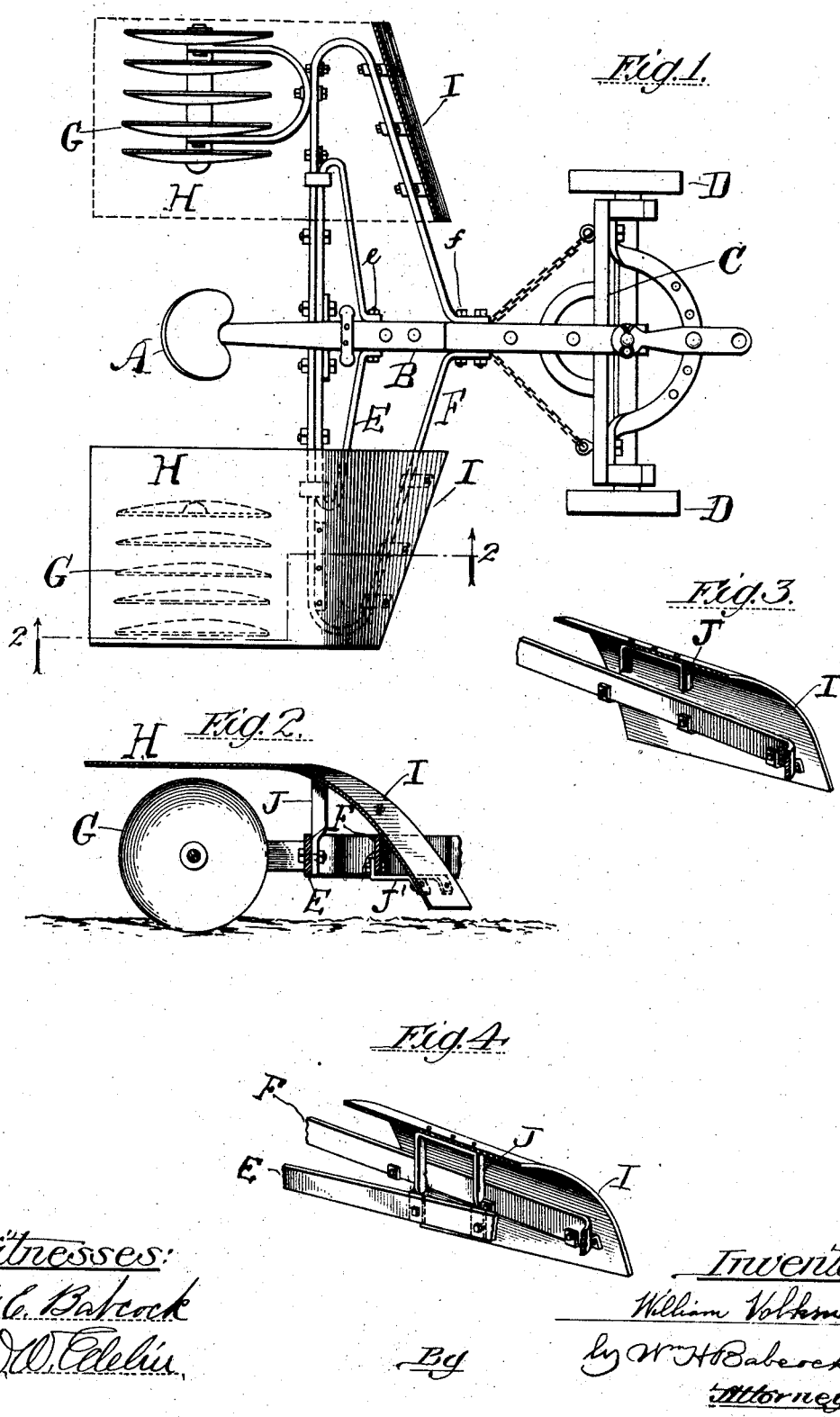

WILLIAM VOLKMOR, OF WHITTIER, CALIFORNIA.

SHIELD FOR AGRICULTURAL IMPLEMENTS.

No. 893,767.　　　　Specification of Letters Patent.　　　　Patented July 21, 1908.

Application filed August 20, 1906. Serial No. 331,300.

*To all whom it may concern:*

Be it known that I, WILLIAM VOLKMOR, citizen of the United States, residing at Whittier, in the county of Los Angeles and State of California, have invented new and useful Improvements in Shields for Agricultural Implements, of which the following is a specification.

The object of this invention is to shield from injury the boughs of orange trees and other low hanging trees when cultivators and like implements are used among them. To this end I employ flexible shields curving downward in front, free to yield in front and unsupported at the rear, so that they may yield readily to the boughs, deflecting them without injury.

In the accompanying drawings Figure 1 represents a plan view partly sectioned, of a double-gang disk cultivator or harrow embodying my invention; Fig. 2 represents a vertical section of the same from front to rear on the irregular line 2—2; Fig. 3 represents a perspective view from the inner side of the forward part of one of the shield sections and of the outer bar of the frame broken away; Fig. 4 represents a view similar to Fig. 3, but showing the proximate parts of both bars of the frame.

"A" designates the seat of the cultivator; B, the beam supporting it and C the draft truck attached pivotally to the forward end of said beam and carried by wheels D.

The rigid frame of the cultivator is composed of two bars E and F, bent into oblong closed curves, one inside of the other, their ends being brought against the sides of the beam and bolted thereto at "e" and "f" respectively.

G designates the rotary cutting disks, which are mounted as usual in two gangs, one on each side of the beam at a convenient interval.

H designates the two shields or shield sections of flexible resilient sheet metal, arranged over the two gangs of disks and the parts of the frame in front of them. The inner edge and outer egde of each disk are at right angles to the rear edge; but the front of each shield section inclines outwardly and rearwardly from the point nearest the beam B and is bent downward with the convex curvature at I.

Each shield section is supported by a raised staple-form bracket J on the bar E of the frame, being riveted thereto through holes and is also attached near its, lower edge to the outer end of a bifurcated horizontal bracket J', on the outer frame bar F. Said brackets are securely bolted to the said bars.

The convex front part I of the shield section between its two points of attachments is capable of yielding to the fruit and bars when struck thereby and its obliquity will divert them outward as they ride up over its inclined and curved face, so that the shock of contact is reduced to the minimum. As there is no support for, nor attachment of, the shield sections in rear of the bar E the weight of the boughs laden with fruit will depress the rear parts of the said shield-sections, bending them in a gentle curve beyond the disks G, so that the said boughs and fruit may slide easily off behind the cultivator and suffer no injury from the fall. The resiliency of the metal will restore the shield section to its former position when thus relieved. The same is true of the convex oblique front part I when the boughs cease to press thereon. It will be seen that both the front and the top of the frame are prevented from contact with the boughs.

The term cultivator is used herein to mean any form of implement drawn along the ground and provided with means for cutting breaking, stirring, or weeding the same.

Having thus described my invention, what I claim as new and desire to secure by Letters Patent is:

1. In combination with a cultivator frame and cutters attached thereto a shield covering said teeth and a part of said frame, extending down in front of said frame and at the rear beyond the said cutters, the rear part of said shield being flexible, unsupported and free to yield under downward pressure substantially as and for the purpose set forth.

2. In combination with a cultivator frame and shaft and two gangs of cutters attached to said frame on opposite sides of said shaft, a pair of shield sections, each covering one of said gangs and the proximate parts of the frame and extending down in front of said frame, the rear part of each shield section being flexible, extended beyond the said cutters and left unsupported in order that it may yield to downward pressure substantially as and for the purpose set forth.

In testimony whereof I affix my signature, in presence of two subscribing witnesses.

WILLIAM VOLKMOR.

Witnesses:
J. C. SANCHEZ,
A. O. MAPLE.